Aug. 15, 1933.   C. L. C. MAGEE ET AL   1,922,054
FRICTION GRIPPING DEVICE
Filed May 9, 1927    4 Sheets-Sheet 1
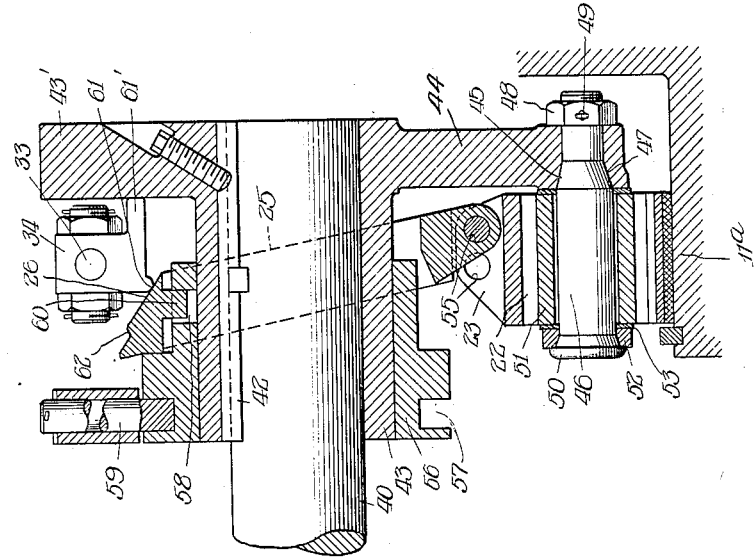
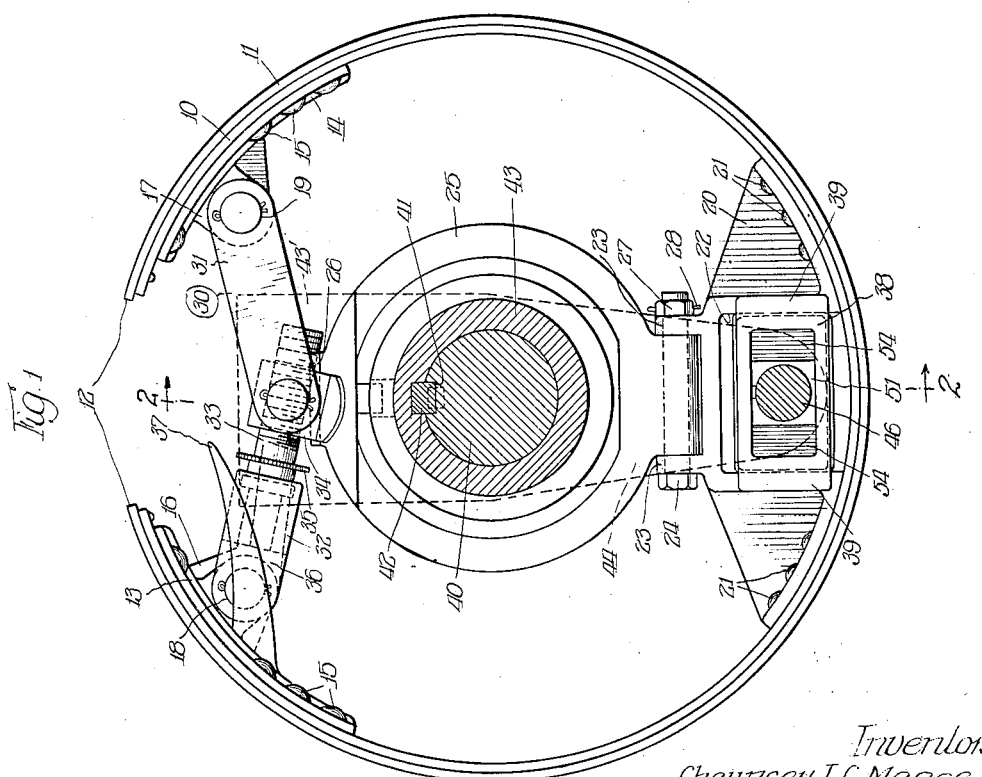
Inventors
Chauncey L. C. Magee,
Benjamin S. Pfeiffer,
Rudolf S. Pfeiffer, Aug. 15, 1933.   C. L. C. MAGEE ET AL   1,922,054
FRICTION GRIPPING DEVICE
Filed May 9, 1927   4 Sheets-Sheet 2
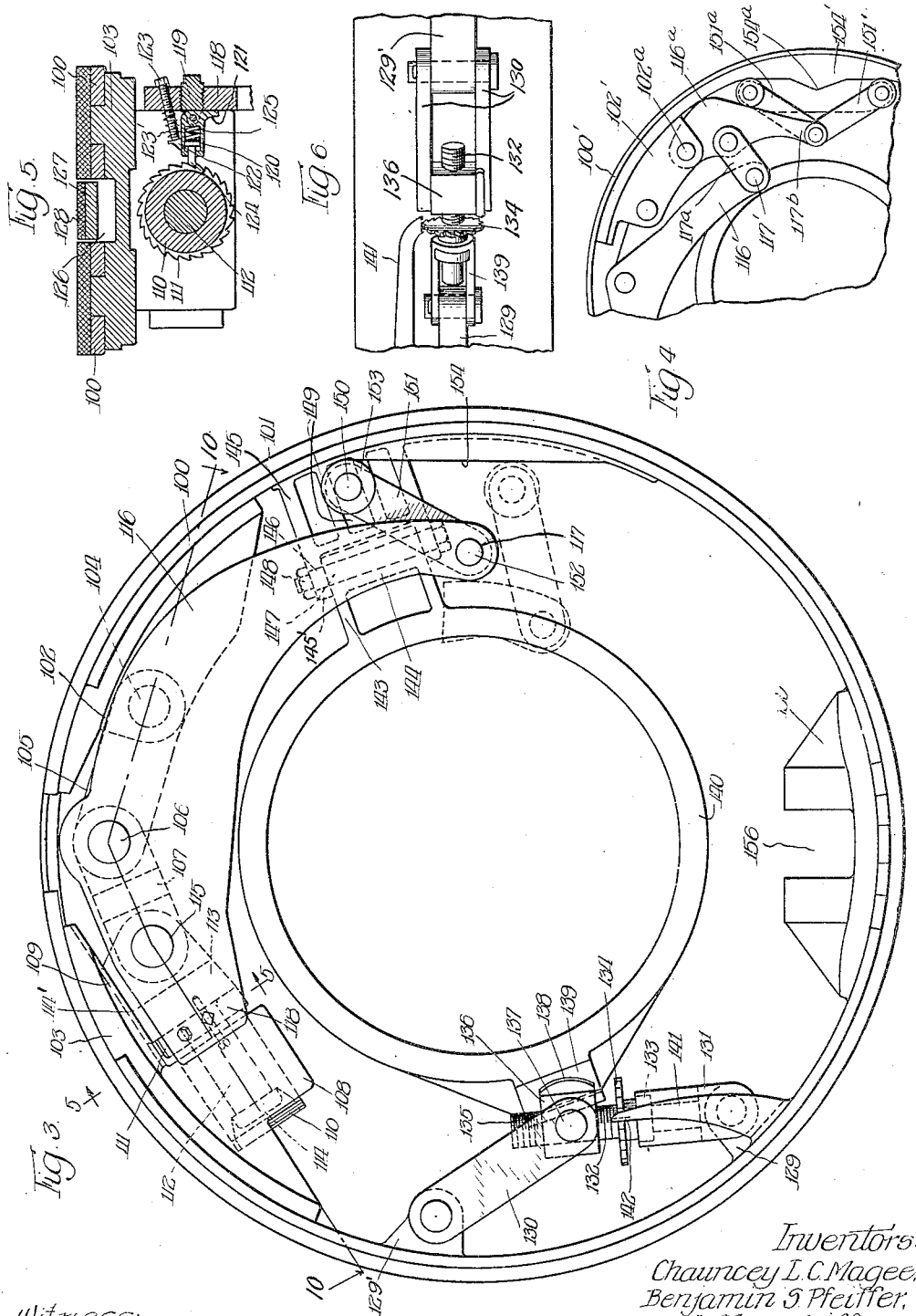
Witness:
R. Burkhardt
Inventors:
Chauncey L. C. Magee,
Benjamin S. Pfeiffer,
Rudolf S. Pfeiffer,
By Wilkinson, Huxley, Byron, and Knight
attys

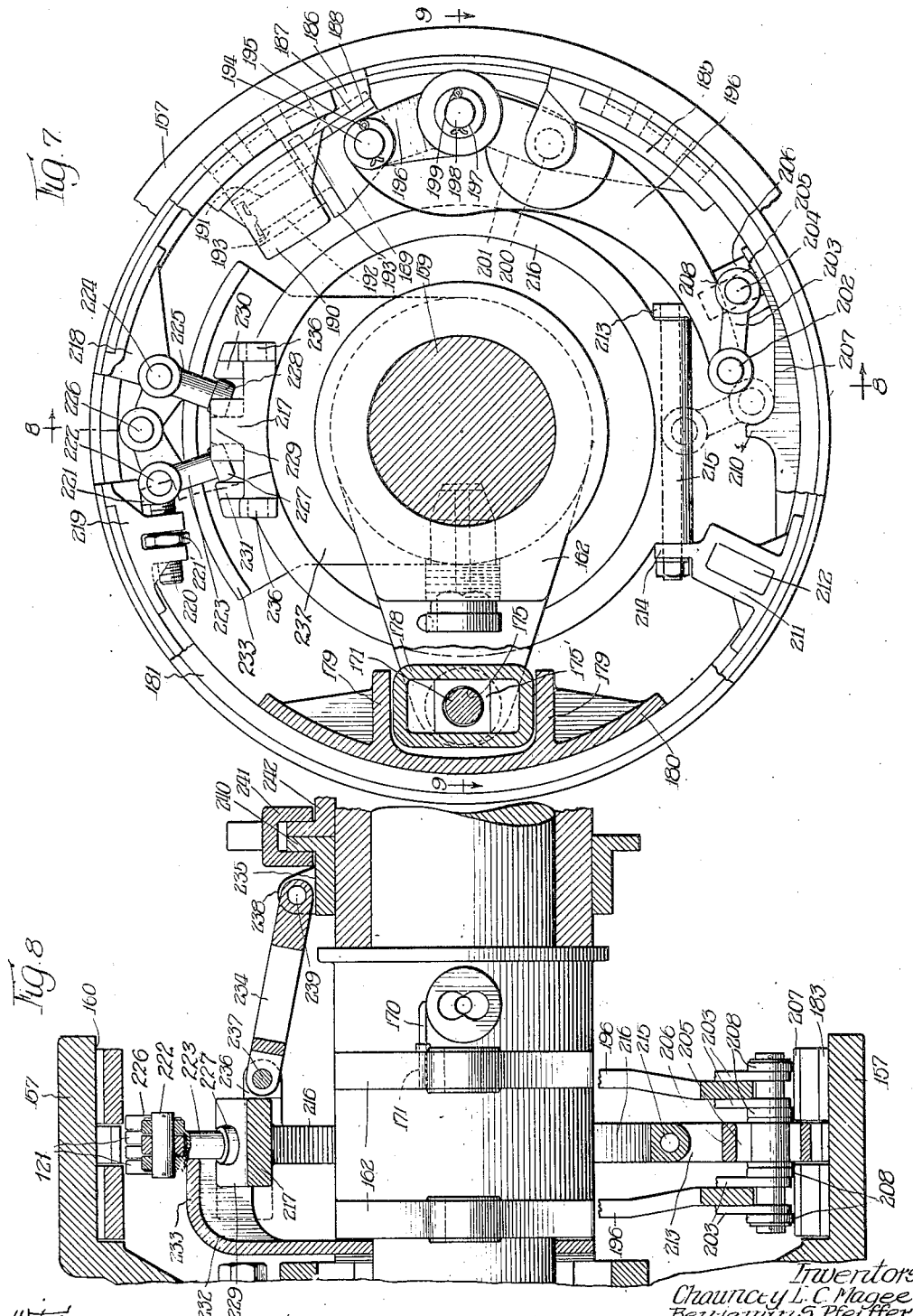

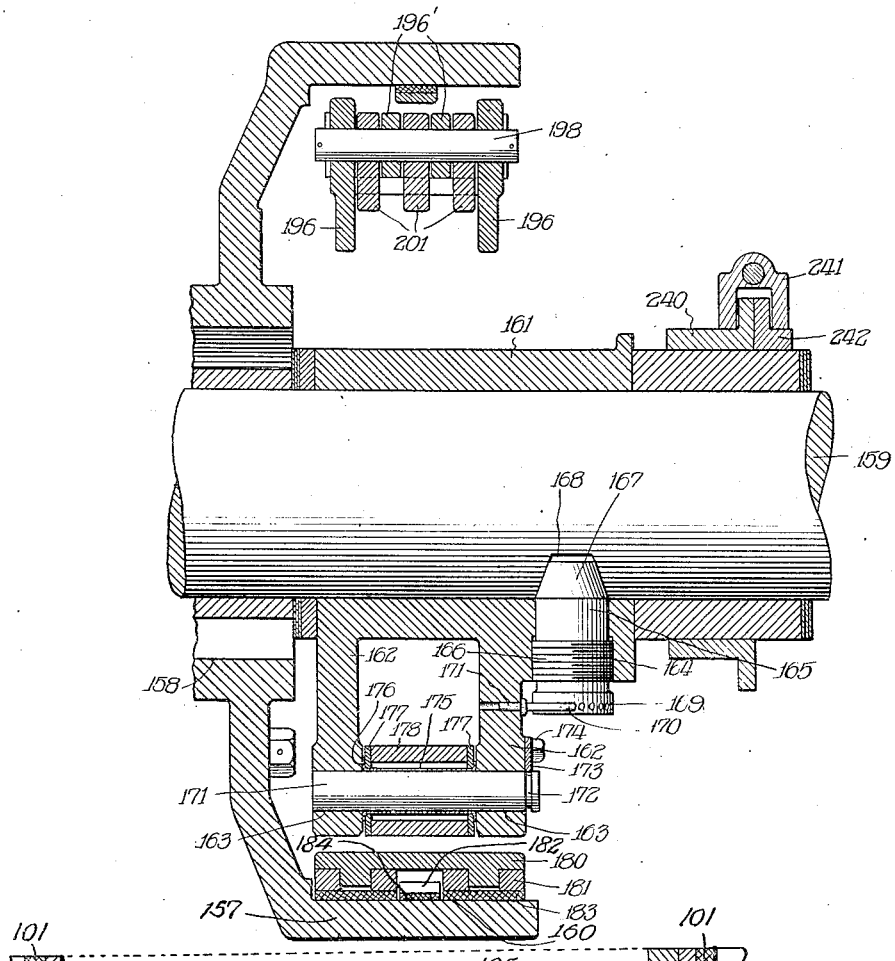

Patented Aug. 15, 1933

1,922,054

UNITED STATES PATENT OFFICE 1,922,054

FRICTION GRIPPING DEVICE

Chauncey L. C. Magee, Benjamin S. Pfeiffer, and Rudolf S. Pfeiffer, Chicago, Ill., assignors to Friction Devices Company, Chicago, Ill., a Corporation of Delaware Application May 9, 1927. Serial No. 190,089

21 Claims. (Cl. 192—35)

This invention relates to gripping devices, more particularly the type of gripping device adaptable for use as a brake in which case one of the elements is stationary, or as a clutch where one of the elements is rotatable and the other capable of being connected to be driven thereby.

One of the objects of our invention is to provide a gripping device in which the gripping action is effected proportional to the torque transmitted therethrough.

Another object of our invention is to provide a gripping mechanism in which the parts are actuated to effect the gripping operation by the torque of the rotary element.

Another object of our invention is to provide a gripping device which embodies the advantages set forth in the above stated objects and by which an effective gripping action may be produced irrespective of any mis-alignment between the parts to be coupled by the gripping device.

Another object of our invention is to provide a gripping device comprising gripping elements adapted for frictional engagement with a friction surface, and which are provided with actuating means capable of automatic adjustment, whereby the proper frictional engagement is always effected irrespective of wear between the parts.

The further object of our invention is to provide a gripping device having actuating means to impart the actuating thrust to the device which is capable of relative movement therewith, whereby an effective actuating connection is always maintained irrespective of mis-alignment between the elements to be coupled.

It is a further object of this invention to provide certain novel structural details for accomplishing the above stated objects and a device which makes for efficiency, economy in manufacture and operation.

These and other objects are accomplished by means of the arrangement disclosed in the accompanying sheets of drawings in which—

Figure 1 is a side elevation of a simple form of our invention showing the expanding element, the resilient connection therefor and the automatically adjusted actuating means for said expanding element.

Figure 2 is a cross sectional side view of the construction shown in Figure 1 taken on the line 2—2 of Figure 1.

Figure 3 is a side elevation of a modified form of my invention in which the operation is effected by the torque of the rotary element.

Figure 4 is a fragmentary view of the modified form of actuating lever connections of the type shown in Figure 3, the connection being adapted for operation by the torque of the rotary element in either direction of rotation.

Figure 5 is a cross sectional view showing the automatic adjustment mechanism for wear compensation, taken on the line 5—5 of Figure 3.

Figure 6 is a detailed view of the automatic adjustment mechanism for the second or servo gripping element shown in Figure 3.

Figure 7 is a side elevation partially in cross section of another modification of our invention, and Figure 8 is a cross sectional side elevation of the modification shown in Figure 7 taken on the line 8—8.

Figure 9 is also a side elevation partially in cross section giving a slightly different view and taken on the line 9—9 of Figure 7.

Figure 10 is a cross sectional view of a portion of the construction shown in Figure 3, taken on the line 10—10 and looking in the direction of the arrows.

The various novel features of the invention will be apparent from the following description and drawings and will be particularly pointed out in the appended claims.

Referring to the drawings, it will be noted that our invention as shown in Figures 1 and 2, is illustrated in the form of a clutch which comprises a gripping member 10 such as a flexible metallic band having a suitable friction material 11, attached on its outer surface. This band is provided with spaced ends 12 and has suitable mechanism connected there-between to cause it to frictionally engage a friction surface 11a shown in Figure 2. On the interior of the band adjacent the ends thereof are suitable brackets 13 and 14, attached by means of rivets 15 or other connecting means, the brackets being provided with depending lugs 16 and 17 which provide bearings 18 and 19 for the opposite ends of the means for expanding the expanding element. On the central surface of the band in a position diametrically opposite the ends 12 is a bracket 20, also attached by any suitable means such as the rivets 21. Bracket 20 is provided with a rectangular opening 22, and has projecting from one side thereof, lugs 23 which are bored in a manner to form a bearing for the bolt 24.

Mounted on the bolt 24 is the actuating ring 25 provided on its periphery with a cam surface 26 at a point diametrically opposite its bearing connection on bolt 24. Bolt 24 is held in position by means of nut 27, locked against movement by the cotter-pin 28. Connected between the bearings 18—19 provided by the lugs attached adjacent the spaced ends of the band, is the toggle link designated generally 30, which is made up of the link 31, the yoke 32, the swivel bolt 33 and the adjustable trunnion block 34. A ratchet collar 35 is fixed to the swivel bolt in a manner to impart a rotary movement to the swivel bolt in the event the collar is rotated.

Mounted on the bracket 13 is a projecting finger 36 with a deflected end portion 37 positioned in close proximity to the collar 35, whereby when the collar 35 is moved relative to the finger 36, it engages therewith in a manner to cause rotation of the collar in the event of a pre-determined amount of movement therebetween.

Mounted in the opening 22 of the bracket 20 is a rectangular housing member 38 provided with laterally projecting lugs 39 which form a guide in engagement with the sides of the opening in the bracket. The opening 22 is of a greater radial dimension than the housing, and consequently, the housing is permitted to move radially relative to the bracket 20. Positioned centrally of the device is the shaft 40 which is connected to one of the elements to be coupled by the gripping device, the shaft being provided with a key way 41, and key 42, for locking the bracket 43 relative to the shaft.

Integral with the bracket 43 is the radial arm 44 which is provided at its lower end with the opening 45 adapted to receive the bearing bolt 46. The bearing bolt is seated in a conical opening 47 and is locked in position by means of the nut 48 and cotter pin 49. The bolt is provided at its opposite end with a large head 50 and has mounted thereon the bearing block 51 and a sleeve 52 and washer 53. The bearing block 51 as shown in Figure 1 is positioned through the intermediate portion of the housing member 38 and has mounted on opposite sides thereof, the resilient blocks 54. The actuating ring 25 is pivoted as above described to the lugs 23 which are provided with two bearing openings 55 so that a selection of mounting is provided in order to modify the action of the cam surface.

Mounted on the bracket 43 in suitable relation is the actuating sleeve 56, having a circumferential groove 57 at one end thereof and an opening 58 at the opposite end. Positioned in the circumferential groove 57 is the pin 59 which is adapted to be connected to suitable operating means for movement in a manner to impart an axial thrust to the actuating collar, but yet provide for a rotation of the collar relative thereto. The actuating ring 25 is provided on its inner surface with a projecting lug 60 positioned in the opening 58 in the actuating collar. In this construction it can be seen that during the rotation of the mechanism the means 59 may be actuated to impart an axial movement to the actuating collar and in turn to the actuating ring whereby the link will be caused to move on its pivot 55 to effect a camming outwardly of the trunnion block 34. Attention is directed to the trunnion block 34 which is provided on its under surface with a rounded projection 61 which is in engagement with the cam surface on the actuating ring and also that the cam surface is provided with a step 62 which will serve as a seat for the projection 61 on the trunnion block when the block has been moved a pre-determined extent outwardly by the cam.

Referring now to Figure 3, we have disclosed a modified form of our invention in which the main gripping members are actuated by the torque of the rotary element, the actuating force being imparted to the main gripping element by means of second gripping elements herein designated as a servo-gripping element. In this modification the servo-gripping element is of the type above described and shown in Figures 1 and 2, except that it is not connected to the shaft 40 as shown in Figure 1, which is one of the elements to be ultimately connected, but is connected to means for actuating the main gripping element, and is capable of movement relative thereto. When the servo-gripping element is caused to engage the rotary element it moves therewith in a manner to cause the main gripping element to expand and to engage the rotary element an extent proportional to the torque transmitted there-between.

In this modification, a toggle link is provided for actuating the main gripping element, and this toggle link is likewise provided with an automatic compensating adjustment for taking up the wear as it occurs during the operation. In this modification, we provide an expansible band 100 as a gripping element, having on its outer face a suitable friction material 101. Positioned at the ends of the band 100 are brackets 102 and 103 attached in any suitable manner. Formed in the bracket 102 is a bearing 104 which serves as a pivot connection for one set of links 105 of the toggle link mechanism, which is connected by the pivot 106 to the other set of links 107 of the toggle link mechanism. The bracket 103 is provided with a centrally threaded sleeve 108 and a grooved guide 109. Positioned in sleeve 108 is the threaded sleeve 110 having a ratchet collar 111 fixed to one end thereof. Positioned through the threaded sleeve 110 is the shank 112 of the yoke bracket 113, the shank being provided with a head 114 locking the shank against axial movement relative thereto by permitting the sleeve to be turned within the sleeve 108 in a manner to cause the yoke to move axially in the guide 109. The yoke is provided with a projection 114' for sliding engagement in said guide 109. The yoke bracket 113 is perforated to form a bearing 115 for the other ends of the links 107 of the toggle link construction.

One of the elements of the toggle link construction 107 is extended at its opposite ends to form the operating lever 116 which is mounted on the bolt 115, and pivots there around and is also mounted on bolt 106 in the same manner as the links 107 of the toggle link construction. The operating lever 116 is preferably of a curved formation and is provided with a perforated end 117 positioned at a point removed approximately 90° from the toggle link construction. The opposite end of the operating lever 116 extends as at 118 to a position in close proximity to the ratchet collar 111 and has provided therein a threaded plug 119 having pivoted thereto the plunger chamber 120. The plunger chamber is provided with a lug 121 in a position to engage the inner surface of the extended portion 118 of the operating lever to limit the pivot movement in one direction and with the lug 122 on its opposite face in engagement with the bolt 123 carried by the operating lever. Positioned around the bolt 123 and in engagement with lug 122 is a coil spring 123' exerting the tension in a direction to move the plunger chamber 120 in a counter clockwise direction as seen in Figure 5.

Positioned in the plunger chamber is a plunger 124 which is held in an outward position by means of the coil spring 125, the plunger 124 being positioned to engage the teeth of the ratchet collar 111. In this construction the parts are so positioned and constructed that the relative movement between the ratchet collar 111 and the operating lever 116 under ordinary operation is less than the distance of one tooth on the ratchet collar so that in an ordinary operation, the plunger 124 merely rides up and down on a single tooth without effecting any movement of the collar or the sleeve 110, but in the event the parts become worn to an extent sufficient to permit a greater movement of the operating lever 116, in order to effect the usual frictional engagement this increased movement causes the plunger 124 to move an extent equal to the length of one tooth and consequently to ratchet over and engage a new tooth, in which case in the return or release movement the sleeve 110 is caused to rotate in the stationary sleeve 108 and to move therewith the trunnion 112 and yoke 113 in a direction to compensate for the wear, whereby the operating lever 116 will resume its normal path of operation which will be a distance less than the length of one ratchet tooth.

Referring to Figure 5 it will be noted that the main friction band 100 is formed of two spaced annulars, the space 126 there-between accommodating a second or servo gripping band 127 which like-wise has friction material 128 on its outer surface. The servo-band 127 has spaced ends in the same manner as shown in the modification in Figures 1 and 2, which are provided with the brackets 129 and 129', respectively at a position substantially 90° removed from the toggle mechanism for operating the main friction band.

Connecting the lugs 129 and 129' is the toggle link construction adapted for automatic adjustment of the same type as shown in the modification shown in Figure 1 and comprises links 130 pivoted to lug 129' and the yoke pivoted to the lug 129. Positioned in the yoke is a swivel bolt 132 which is provided with a head 133 to prevent axial displacement and also a ratchet collar 134 and a threaded end 135. Positioned on the threaded end is a trunnion block 136 having trunnion bearings 137 extending from opposite sides thereof, and which form the pivot connection for the other ends of the links 130. The trunnion block is provided on its other side with a rounded portion 138 adapted to engage and to be actuated by the cam surface 139 of the actuating ring 140. Mounted on the bracket 129 is a projecting finger 141 having a portion 142 positioned in close proximity to the ratchet collar 134 in a manner to engage a tooth to cause rotation thereof during relative movement between the collar and the finger.

In this construction the parts are so proportioned that when the toggle link moves in the course of ordinary operation, the relative movement between the finger and the ratchet collar is less than the distance of one tooth and consequently, the finger which is somewhat resilient merely rides up and down the surface of the tooth with which it engages. However, in the event that the parts become worn to an extent sufficient to necessitate an increased movement of the toggle link to cause a gripping of the servo-band then the finger will be caused to ratchet over and engage a second tooth and to thereby cause rotation of the ratchet collar upon the return or release movement of the toggle link. This operation is effective to restore the parts to such a position as to compensate for wear, the operation being wholly automatic and occurring only at such time as is necessary after a pre-determined amount of wear has been produced.

The actuating ring 140 is provided at a point diametrically opposite the cam surface 139 with the projections 143 having a bearing 144 therethrough so as to form a pivot, mounted on the radially projecting bracket 145, carried on the inner face of the servo expanding band. The bracket has upstanding ears 145', perforated to form bearings 146 in a manner to receive the bearing bolt 147 held in position by nut 148. Provided in the bracket 145 is the radial slot 149 forming a guide for the shaft 150, which shaft is positioned in one end of the links 151 connected at their opposite ends 152 to the end 117 of the operating lever 116. The shaft 150 is provided on its outer ends with rollers 153 which are adapted to run on a track-way 154, having a straight surface and positioned on the inner face of the expanding band 100. It is readily understood that when the servo-band rotates relative to the main band by virtue of being gripped to the rotating element that the bracket 145 is caused to move relative to the operating lever 116. When this operation is effected the bracket carries the shaft 150 with it and causes the rollers to roll along the track 154 and to eventually assume the dotted line position as shown in Figure 3. When the operating lever is moved to the dotted line position the pivot 106 of the toggle mechanism is caused to move radially inwardly and the links 105 and 107 to straighten and the friction band to expand and frictionally engage the rotary element. The friction band has provided on a portion of its interior surface a bracket 155 which is slotted as at 156 in a manner to receive resilient elements to effect a coupling which is capable of yielding in a circumferential and angular direction in the same manner as the coupling connection described above and shown in Figure 1. This coupling serves to connect the main band with a bracket secured to a shaft or other element to be ultimately connected with the rotary element.

Referring now to Figure 4, it will be noted that our invention contemplates a modified form of connection for the operating levers whereby it is possible to utilize the torque of the rotary element in both directions of rotation. The purpose of a connection of this kind is to provide an operating lever, the outer operating end of which moves in a path which is suitable for connections operated by the torque in either direction of rotation.

In the modification shown we have provided a connection having the outer end of the operating lever travel in a path which more nearly approaches a radial path than does link 116 as shown in Figure 3. This makes it possible for the operating lever to derive its operating force from either direction.

Referring to Figure 4, it will be noted that we have provided a lever 116' with the outer end 117' corresponding to the outer end 117 of the lever 116. The bracket 102' has a second bearing 192a on whcih is pivoted a second operating lever 116a. Lever 116' and lever 116a are connected by a suitable link 117a whereby operative movement imparted to the lever 116a will be in turn transmitted to the operating lever 116'. By virtue of the location of the pivot point 102a of the lever 116a the outer end 117b of the operating lever 116a is caused to move in a path which approaches the radial line. On the interior of the expanding band 100' is a double track-way 154' with a central enlargement 154a. This makes it possible to connect either of two links 151' and 151a to the end 117b whereby torque from either direction can be employed to move the lever depending upon the direction of rotation. These levers are provided with rollers and a shaft therefor mounted in a bracket carried by the servo band in the same manner as the shaft and bracket as shown in Figure 3.

In the modified form of our invention shown in Figures 7-9 inclusive, it will be noted that the gripping mechanism is substantially like that shown in Figure 3, except for a few structural details. One of the elements to be connected by the gripping device is constructed in the form of a drum 157, mounted on a bearing 158, concentric with the shaft 159, on which shaft is connected the other part of the gripping mechanism. The drum 157 is provided with a friction surface 160 on its inner periphery in a manner shown in Figures 8 and 9.

Mounted on the shaft 159 is a bracket 161 having two radial arms 162, with bearing openings 163 at the outer ends thereof. The bracket is provided with a radial, threaded opening 164 adapted to receive the locking bolt 165 by the threaded engagement 166 in a manner to lock the bracket on a shaft 159 by means of the conical end 167 of the bolt fitting in the conical opening 168 provided in the shaft. It will be noted that the head of the bolt 165 is provided with a plurality of radial openings 169, adapted to receive one end of the pin 170 which is seated at its other end 171 in an opening provided in one of the radial arms 162 of the bracket. This provides a lock device for the bolt whereby it will be held from turning when it is placed in seated relationship with the socket 168.

Mounted in the bearing openings 163 in the outer ends of the radial arms is a bearing pin 171, which is provided with a groove 172 at one end thereof adapted to receive the edge of a plate 173 to maintain the bolt in its inserted position. The plate 173 is held in fixed relationship on the arm 162 by the bolt 174, the plate being extended at its opposite end for a specific purpose to be hereinafter described. Closely surrounding that portion of the bolt lying between the radial arms 162 is a sleeve 175 having upturned ends 176 which embrace the side plates 177 positioned on each side thereof. Surrounding the bolt and sleeve and in abutment with the side plates 177 is a rectangular housing member 178 with internal dimension which provides for space between its inner surface and the bolt and sleeve construction positioned therethrough. Pivoted on the bearing pin 171 is a block 175' in abutment at two sides with the inner surface of the housing member 178. Provided in the space between the block 175' and the sides of the housing are resilient bodies preferably of rubber, which are held under an initial compression by the housing member, block and side plates. The housing member is adapted to fit between two radial walls 179, provided on a bracket 180 positioned on the inner surface of the main friction band 181.

It will be noted from Figure 9 that the main friction band is divided in two parts and that the servo-band 182 is positioned there-between. The main band is provided with a facing of friction material 183 and the servo-band has a like facing 184. The construction just described provides for a resilient connection between the shaft 159 and the main friction band mechanism whereby a circumferential yielding is provided through the medium of the resilient bodies and a relative radial movement is provided for by a sliding of the housing 178, relative to the walls 179 on the bracket 180. This type of connection is similar to that previously described in connection with the other figures and is one which is operative irrespective of mis-alignment of the elements to be coupled. In other words, if the friction band, by virtue of its contact with the friction drum 157 is eccentric to the center of shaft 159 because of worn bearings of the drum, this mis-alignment of the parts will be compensated for in the flexible connection referred to.

Referring to Figure 7 it will be noted that the main friction band has spaced ends on which are mounted the brackets 185 and 186 respectively. The bracket 186 is provided with a groove 187 adapted to receive the tongue 188 of the sliding yoke member 189 in a manner similar to that described in the mechanism shown in Figure 3. The bracket 186 is also provided with a lug 190 having a bore 191 therethrough, adapted to receive the shank 192 of the yoke member in a manner to permit adjustment of the yoke member to compensate for wear. This modification of the device is not illustrated with an automatic adjustment for wear as shown in connection with the modification disclosed in Figure 3, but one which is capable of being manually adjusted for the same purpose. It is to be understood, however, that any form may be employed and is contemplated in this invention. The shank 192 therefore, swivels in a threaded sleeve 193 having an enlarged collar 193' constructed for manual operation. The end of the shank is slightly enlarged after it is inserted to prevent axial movement thereof. When the collar 193' rotates in one direction it effects a movement of the yoke in a direction to compensate for wear. The yoke, it will be noted, has a bearing pin 194 mounted in the outer end thereof held against displacement by the cotter-pin 195. Mounted on the bearing pin 194 is the combined link and operating lever designated 196. The lever 196 is provided with a bearing opening 197 for the reception of the pin 198, held against displacement by the cotter-pin 199 and serves with the other links 196' in a manner similar to that shown in Figure 3 as one of the halves in the toggle link mechanism. Connected between the pin 198 and the bearing 200 provided on the bracket 185 on the other end of the band, are other links 201 of the toggle link mechanism which act to expand the band when the operating lever 196 is moved inwardly.

Mounted in the end of the operating lever 196 is the bearing pin 202 on which is mounted the connecting link 203, the other end of which is carried on the pin 204 mounted in the slot 205 provided in the bracket 206, attached on the inner surface of the servo-band. The main band is provided with a double track-way 207 in the same manner as described in the connection of the modification shown in Figure 4 and the pin 204 has provided on its outer ends rollers 208 adapted to roll thereon. The track-way has a projection 210 intermediate of its length to divide it into two portions whereby it will be suitable for connection to operate the mechanism from the torque of the drum rotating in either direction.

It will be noted that a second bracket similar to the bracket 206 is provided at 211 spaced on the opposite sides of the track-way and is constructed with a slot 212 similar to the slot 205.

In the event the torque is to be utilized on a drum which is rotating in a counter clock-wise direction, the bearing pin 204 will be mounted in the slot 212 instead of slot 205. The upper ends of both of the brackets 206—211 are provided with the lugs 213 and 214 respectively, having bearing openings forming supports for the pin 215. Pivoted on the pin is the actuating ring 216 which is provided at a point diametrically opposite the pivot support with a double cam portion 217.

The servo-band 182 is provided with spaced ends positioned at a point diametrically opposite the brackets 206 and 211, and the ends carry brackets 218 and 219 on their inner surfaces. Bracket 219 has an opening for receiving the shank 220 of the supporting member 221. The supporting member is provided with a bearing for receiving the pin 222 on which pin the bell crank lever 223 is pivoted. The bracket 218 is provided with a bearing for supporting the bearing pin 224 which has a second bell crank lever 225 pivoted thereon, the inner ends of the two bell crank levers being pivoted together by means of the bolt 226 in a manner to form a toggle link having inwardly extending arms for engaging the cam portion 217.

Attention is directed to the fact that the shank 220 of the yoke is adjustable in the bracket for the purpose of taking up wear in the same manner as the toggle link construction of the servo band shown in Figure 3 except that it is not automatically operated. When the mechanism is to be adjusted, the shank is moved manually in its bracket a desired amount by turning the nut 221' whereby, the operation of the toggle link will have the same expanding action on the servoband as when the parts are new and unworn.

The inwardly extending arm of the bell crank lever 223 is provided with a cam engaging portion 227 and the inwardly extending arm of the bell crank lever 225 is provided with a cam engaging portion 228. These portions are in engagement with the opposite sides of the lug 229 carried on the cam portion 217, the lug having sides which are at angular relations to the longitudinal so that when the ring is pushed in one direction the inwardly extending arms will be forced to move apart, and when the ring moves in the opposite direction the arms will be caused to approach each other, the arms, during the latter operation engaging cam lugs 230 and 231 positioned on the outside of the inwardly extending arms. As shown in Figures 7 and 8, a backing plate 232 is mounted on the shaft 159 and fixed relative thereto, the backing plate having an arcuate flange 233 in engagement with the inwardly extending arms of the bell crank levers. This plate extends through a substantial arc so that the arms may remain in contact therewith when the servo band moves relative to the main band in operation.

In order to operate the gripping device, movement is imparted to the actuating ring 216 by means of the link 234 and sliding collar 235 as shown in Figure 8. The cam portion 217 is provided with lugs 236 which are bored to receive the pin 237 on which the link 234 is mounted. The sliding collar 235 is provided with a pair of upstanding lugs 238 which are bored to receive the pin 239 on which the other end of the link 234 is pivoted. The collar has a circumferential flange 240 which is surrounded by a grooved ring 241 which is connected through instrumentalities to impart a longitudinal sliding movement to the collar when it is desired to actuate the gripping device.

Attention is called to Figure 8 which discloses a second annular collar 242 having a flange surrounded by the grooved ring 241, but which extends in the opposite direction. This is for the purpose of actuating a second gripping device similar to the one disclosed, positioned on the opposite side of the sliding collar, this being the desirable arrangement when two clutches or other friction gripping devices are to be placed for selectively connecting either of two drum members with the shaft. In the event the shaft 159 is rotating, the collars 240 and 242 will turn with the shaft, but the grooved ring 241 will remain stationary, the construction permitting longitudinal movement to be imparted from the ring to the collars during relative rotation therebetween. The plate 173 shown in Figure 9 which engages the groove 172 of the connecting bolt 171 is extended in opposite directions in a manner to project over the portions 179 of the bracket 180. In this position the plate has a dual function, namely, to hold the bolt 171 against displacement and to prevent any outward movement of the friction band mechanism. From an inspection of Figure 7 it will be noted that the friction band assembly is free to move outwardly, in that the housing member 178 will slide between the walls 179 of the bracket, but with the plate 173 carried on the radial arms 162 fixed to the shaft, extending over a portion of the bracket, the friction band assembly is held properly positioned within the drum.

In operation, referring particularly to the form of our device disclosed in Figures 1 and 2, it will be noted, when it is desired to effect a gripping operation, the sliding collar 56 is moved to the right by means of the actuating pin 59, in which case the inwardly projecting lug 60 provided on actuating ring 25 is forced inwardly in a manner to cause the rounded projection 61 to ride up the cam surface 26. By the inward movement of the cam surface a component of force in a longitudinal direction is exerted on the trunnion block 34 which is taken on the bracket 43 by the bearing engagement of the lug 61' on the projection 43' provided on the bracket 43. The camming action results in an outward movement of the trunnion block which causes a straightening of the toggle link connection and a consequent expanding of the gripping band 10. In the gripping position, the projection 61 rests on the step 62 provided on the cam surface so that all of the force exerted by the band will be imparted in a radial direction only. When it is desired to release the gripping device, the sliding collar is moved to the left, in which case the inwardly projecting lug 60 will be engaged by the opposite shoulder of the actuating ring provided by the opening 58 and will be moved to the left as shown in Figure 2. When the cam surface is moved to the left, the trunnion block is permitted to slide down the cam surface by the inherent resilience of the friction band, in a manner to release operations of the friction band. In the event the parts become worn, the movement of the toggle link will be gradually increased as the wear increases until the predetermined amount of excess movement is effected in which case the ratchet collar will move past the projecting finger 36 an extent sufficient to cause the finger to engage a new tooth on the ratchet collar, and on the return movement thereof will move the ratchet in a direction to rotate the bolt 33 and adjust the length of the toggle link to compensate for the wear.

Referring to the modification shown in Figure 3 in operation, the servo-band is operated by the actuating ring 140 in the same manner as described in connection with the device shown in Figure 1 so that the servo-band will be caused to rotate with the rotating element to be gripped. In such an event the bracket 145 provided on the inner surface of the servo-band rotates relative to the actuating lever 116 in a manner to cause the connecting link 151 to move the actuating lever to the dotted line position. The movement of the lever causes straightening of the toggle link connected between the spaced ends of the main friction band, whereby the main friction band is expanded and caused to grip the rotating drum. In this mechanism an automatic adjustment for the main friction band operates in a manner similar to that previously described with the exception that the actuating finger moves past the collar instead of the ratchet collar being moved past the stationary finger. In either case, however, the principle is exactly the same, the operation being effected by relative movement between the parts.

In the modification shown in Figure 4, the operation is substantially like that in Figure 3, except that a second actuating lever 116a is pivoted to the bracket 102' in order to provide a movement at the outer end thereof which approaches more nearly a radial path than that of the lever 116. This permits the connection of levers 151a and 151', as shown in Figure 4 so that the torque in either direction of rotation may be utilized to actuate the device.

The operation of the form of our device shown in Figures 7 and 8 is substantially like that shown in Figure 3, with the exception of the cam movement for the servo-band, which in the latter case engages laterally with the parts of the toggle link.

In all of these constructions we have provided the resilient connection between the friction band and the shaft which carries the friction band, whereby a relative displacement or misalignment may take place without effecting the expansion of the band. In the event that the bearings become worn, the frictional elements to be gripped together will be mis-aligned and in such an event can continue to operate efficiently due to the fact that relative movement is provided in the resilient connection. Also, in the forms shown in Figures 3 to 9 inclusive, we have provided a gripping device which utilizes the torque of the rotary element to operate the gripping mechanism. This makes for a smooth gripping action and one which will be proportional to the load placed thereon. Attention is called to the fact that the actuating means for our mechanism moves in an axial direction and consequently, a force may be applied thereto through means which will permit a slight radial displacement there-between, allowing for the mis-alignment above referred to without detrimental results.

It is to be understood that the present invention relates to friction gripping mechanism, either in the form of a clutch, as illustrated, or a brake or other similar devices. Although we have illustrated our invention as embodied in various forms of clutches, where both elements which are to be connected by the friction mechanism are rotated, it is obvious that the principles of the present invention may be employed in a brake where one of the elements is stationary. As far as the operative principle is concerned, the problem is merely one of frictionally fixing two elements relative to each other, and this may be in the form of a clutch where one rotating part is fixed relative to another part which is caused to rotate with, it or in brakes where a stationary part is fixed relative to a rotating part to bring the rotating part to rest. The present invention, therefore, contemplates such structural modifications as are necessary to embody the principles herein set forth in suitable brake constructions.

We claim:

1. In friction gripping devices two elements to be coupled together, a member having a friction surface fixed to one of said elements and a bracket fixed to the other of said elements, a gripping member carried by said bracket through a connection permitting slight relative movement between said gripping member and said bracket, and means carried by said gripping member for actuating said gripping member—and a second means carried by one of said elements for imparting operative movement to said first means but permitting a relative radial displacement therebetween, whereby, said gripping member is caused to grip said friction surface to couple said elements together, irrespective of mis-alignment of said elements.

2. In friction gripping devices, a member having a friction surface, and an expanding element positioned for friction engagement therewith, said expanding element having spaced ends and means carried thereon between said spaced ends for expanding said element and an independent means carried on said expanding element at a point opposite said first named means and operable to actuate said first named means.

3. In friction gripping devices, a member having a friction surface, and an expanding element positioned for friction engagement therewith, said expanding element having spaced ends and means carried thereon between said spaced ends for expanding said element and an independent means carried on said expanding element for actuating said first means—said first means being automatically adjustable in operation to compensate for wear.

4. In friction gripping devices, a rotary element having a friction surface, a second element to be coupled thereto, having a bracket fixed thereon, a gripping member connected to said bracket through means permitting slight relative movement therebetween, and actuating means for, and carried by said gripping member, and a second gripping member connected to operate said actuating means and capable of movement relative to said first gripping member and means for causing said second gripping means to engage and move with said rotary element, whereby said first gripping member is caused to grip said friction surface.

5. In friction gripping mechanism a rotary element having a friction surface, an expanding means positioned for frictional engagement with said friction surface, means carried by said expanding means for expanding said expanding means by an axial thrust only, said expanding means being capable of movement with said rotary element, a second expanding means positioned to engage said friction surface and provided with means for causing it to expand, said last named expanding means being connected to said first named expanding means, whereby said first named expanding means when expanded moves with said rotary element and thereby causes an expansion of said expanding means.

6. In a friction gripping device an element having a friction surface and a gripping element positioned for frictional engagement with said friction surface, said gripping element having spaced ends with an adjustable bearing mounted on one of said ends, a toggle link connected to said adjustable bearing and to said other end, having one of its links extended to form an operating lever for said gripping element, said bearing having means utilizing the relative movement between said lever and said bearing to cause said bearing to move and compensate for wear, and said lever having a portion for engaging said last named means.

7. In a friction gripping device, a friction surface and a member for engaging said surface having spaced ends, means operable to expand said member to grip said friction surface, an actuating element carried opposite said spaced ends on said member and adapted to actuate said means through components of its movement extending in an axial direction.

8. In a friction gripping mechanism, a rotary friction surface and an element to be coupled therewith, a friction gripping means adapted to engage said friction surface, and means connecting said element and friction gripping means, said last named means being constructed to permit free sliding movement between said element and friction gripping means in radial directions, and a relative yielding movement in circumferential and angular directions.

9. In a friction gripping mechanism, a rotary friction surface and an element to be coupled therewith, a friction gripping means adapted to engage said friction surface, and means connecting said element and friction gripping means, comprising an intermediate element, and means providing for relative radial movement between said intermediate element and said friction gripping means and means providing for a relative yielding movement between said intermediate element and said first named element.

10. In a friction gripping mechanism, a rotary friction surface and an element to be coupled therewith, a friction gripping means adapted to engage said friction surface, and means connecting said element and friction gripping means, said last named means being constructed to permit free sliding movement between said element and friction gripping means in radial directions, and a relative yielding movement in circumferential and angular directions, said last named means providing relative movement in a radial direction to permit said gripping means to move into and out of engagement with said friction surface, and to provide additional yielding movement for misalignment.

11. In a friction gripping mechanism, a rotary friction surface and an element to be coupled therewith, a friction gripping means adapted to engage said friction surface, and means connecting said element and friction gripping means, said last named means being constructed to permit free sliding movement between said element and friction gripping means in radial directions, and a relative yielding movement in circumferential and angular directions, comprising a housing connected with radial sliding movement to said friction gripping means, and a yielding connection between said housing and said element.

12. In a coupling, two members to be connected and means for connecting said members, comprising a housing mounted to move with one of said members in predetermined directions but movable relative thereto in other directions, and a portion of the other of said members extending into said housing and confined rubber blocks between said last named member and said housing, said blocks being subject to compression only in operation.

13. A rotary friction gripping device, comprising a friction surface, an element to be coupled thereto, and a friction gripping means adapted to grip said friction surface, means carried by said friction gripping means for causing said friction gripping means to grip and release said friction surface and an actuator for said last named means, and a connection between said means and actuator for transmitting axial movement only of said actuator to said means.

14. In a friction gripping device, a rotary friction surface, and a friction gripping means adapted to grip said surface, and having spaced ends, toggle links connected between said ends for actuating said friction gripping means, one link of which is extended, means adapted to move circumferentially with said rotary friction surface, and connecting means between said last named means and said extended link, said extended link and connecting means being so constructed and disposed as to cause said circumferential movement to actuate said friction gripping means.

15. In friction gripping devices, a member having a friction surface, and an expanding element positioned for frictional engagement with said friction surface, said expanding element having spaced ends and means carried thereon between said spaced ends for expanding said element and a second means carried on said element adapted to actuate said first means by movement in a direction substantially axially of said friction surface.

16. In a friction gripping device, a member having a cylindrical friction surface, two independently mounted expansible bands adapted for frictional engagement with said friction surface, independent toggle mechanism for each of said expansible bands, means for actuating the toggle mechanism of one of said bands and means connecting the toggle mechanism of the other of said bands to said first named band.

17. In a friction gripping device, a friction surface, an expansible band adapted for frictional contact with said friction surface, means comprising an extended lever end for actuating said expansible band, a second band mounted independently of said first band and having means for causing it to engage and have a limited traveling movement with said friction surface, and means connecting the end of said extended lever to travel with said second band, whereby to actuate said first band, and cam means on said first band for controlling the movement of said last named means.

18. In a friction gripping device, a friction surface, an expansible band adapted for frictional contact with said friction surface, means comprising an extended lever end for actuating said expansible band, a second band mounted independently of said first band and having means for causing it to engage and have a limited traveling movement with said friction surface, and means comprising an anti-friction device connecting the end of said extended lever to travel with said second band, and cam means on said first band for contacting said anti-friction device whereby to control the movement of said last named means and to actuate said first band.

19. In a friction gripping device, a friction surface, an expansible band adapted for frictional contact with said friction surface, means for actuating said expansible band comprising an extended lever, said lever having anti-friction mechanism on its extended end, and means for actuating said extended lever comprising means for imparting movement thereto and a cam surface in contact with said anti-friction mechanism.

20. A rotary friction gripping device comprising a cylindrical friction surface and an element to be coupled thereto, a friction gripping means connected to said element and adapted to grip and release said friction surface, said friction gripping means being capable of movement with respect to said element whereby it is centered by contact with said friction surface and means for actuating said friction gripping means by application of force devoid of any tendency to displace said frictional gripping means in radial directions.

21. A rotary friction gripping device comprising a friction surface and an element to be coupled thereto, a friction gripping means connected to said element by means of a shiftable connection permitting said friction gripping means to be centered by said friction surface, said friction gripping means adapted to engage said friction surface, and means for actuating said friction gripping means adapted to transmit actuating movement in a direction axially of said friction surface only whereby movement of said last named means in other directions due to misalignment will have no actuating effect on or disturb the centered position of said friction gripping means.

CHAUNCEY L. C. MAGEE.
BENJAMIN S. PFEIFFER.
RUDOLF S. PFEIFFER.